Jan. 11, 1966  M. L. KEMPTON  3,228,336
ROD WARHEAD
Filed May 31, 1956  6 Sheets-Sheet 1

INVENTOR
M. L. KEMPTON

BY

ATTORNEYS

Jan. 11, 1966   M. L. KEMPTON   3,228,336
ROD WARHEAD

Filed May 31, 1956   6 Sheets-Sheet 2

INVENTOR
M. L. KEMPTON

BY
ATTORNEYS

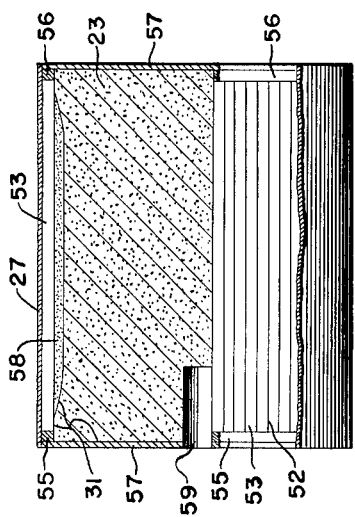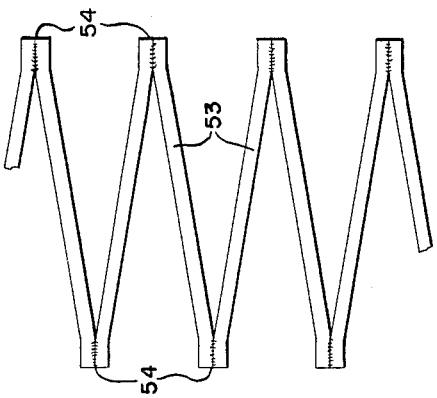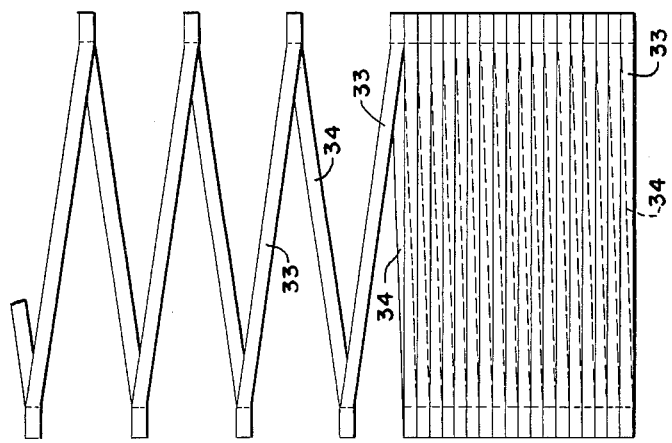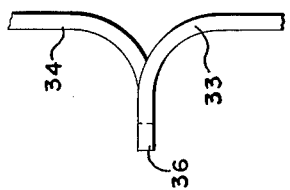

Jan. 11, 1966 M. L. KEMPTON 3,228,336
ROD WARHEAD
Filed May 31, 1956 6 Sheets-Sheet 4
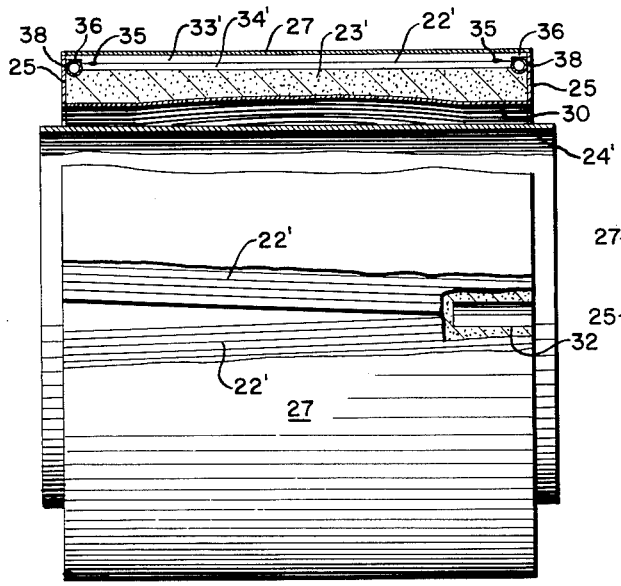
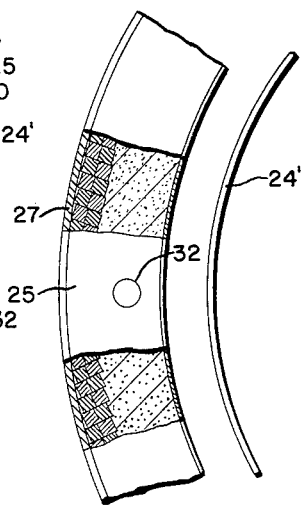
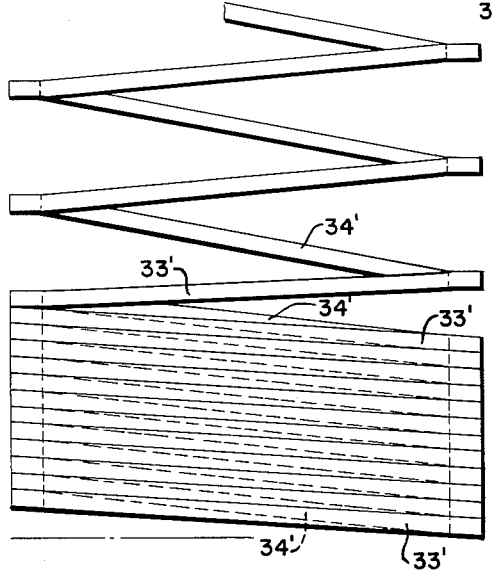
INVENTOR
M. L. KEMPTON
ATTORNEYS

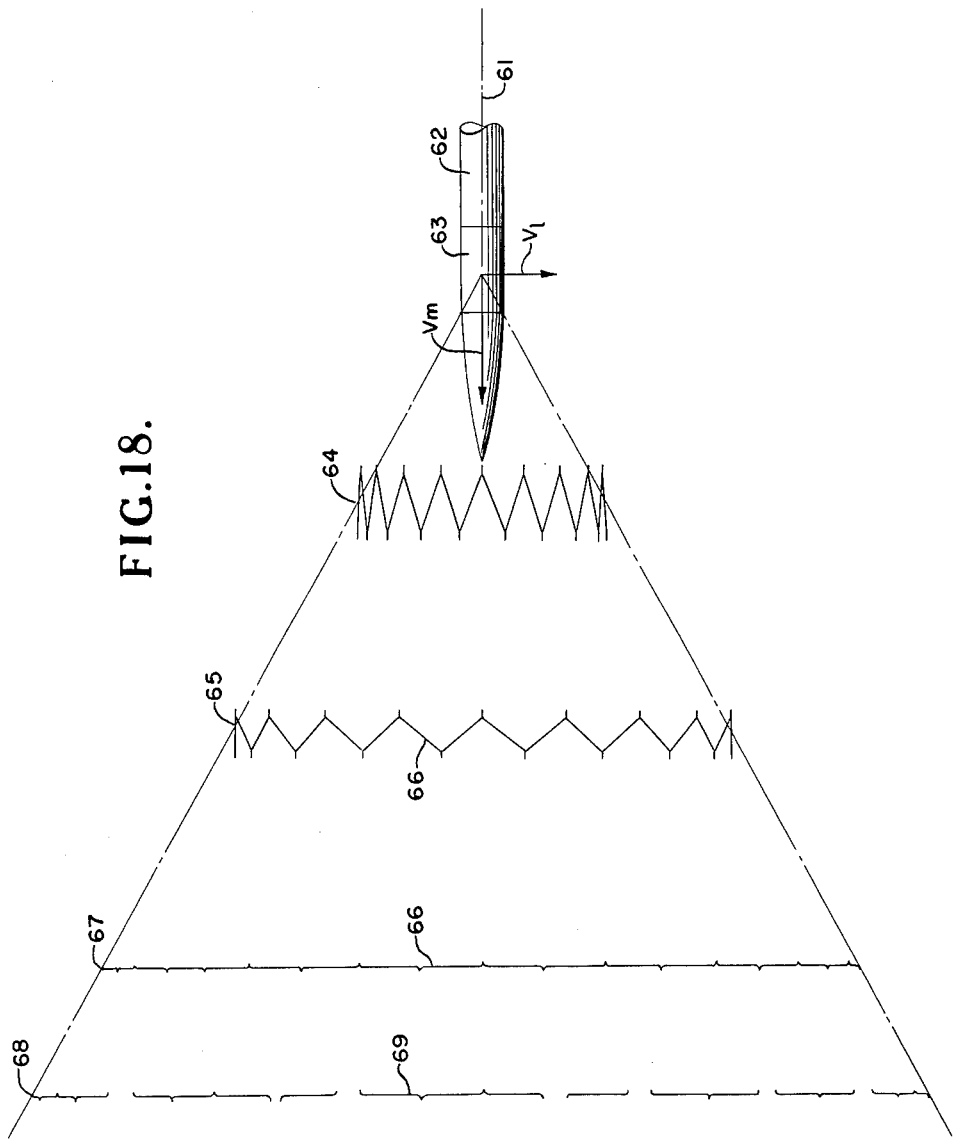

Jan. 11, 1966   M. L. KEMPTON   3,228,336
ROD WARHEAD

Filed May 31, 1956   6 Sheets-Sheet 6

INVENTOR
M. L. KEMPTON

BY
ATTORNEYS

United States Patent Office 3,228,336
Patented Jan. 11, 1966

3,228,336
ROD WARHEAD
Marvin L. Kempton, Socorro, N. Mex., assignor, by mesne assignments, to the United States of America as represented by the Secretary of the Navy
Filed May 31, 1956, Ser. No. 588,576
21 Claims. (Cl. 102—67)

The present invention relates to an explosive warhead of the rod type and method of making the same, and more particularly to a new and improved rod warhead which employs a plurality of rods joined together to form a substantially continuous loop or ring.

With the development of larger and stronger aircraft, it has been found that anti-aircraft artillery missiles containing fragmentation warheads have become less and less effective in their ability to destroy or "kill" the traget aircraft, for the reason that the individual fragments are too small or are not sufficiently concentrated to damage a large enough section of the structure of the aircraft to cause a complete failure thereof. The use of a plurality of rods individually propelled from a warhead was found to give a higher degree of "kill" than individual fragments but has not been found to be completely effective because a rod of sufficient length could not be incorporated into the allocated space in the warhead to effectively "kill" the target.

Essentially, the present invention comprises a plurality of rods and a shaped explosive charge, the rods being connected together or joined at their end-portions in a manner such that the detonation of the explosive charge expands the connected rods at high velocity into a substantially continuous loop or ring for projection into a target for the purpose of increasing the probability of "kill" or destruction of the target and thus overcoming the indicated limitations of prior art devices of this type.

A primary object of the present invention, therefore, is to provide a warhead comprising a shaped explosive charge and a plurality of rods, the rods being end-connected together and expandable at high velocity, by the detonation of the explosive charge, into a substantially continuous loop or ring for projection into a target to increase the probability of "kill" of the same.

Another object of this invention is to provide a connected rod type warhead in which the total effective length of the connected rods is greater than the length of each individual rod and the connected rods produce a substantially continuous loop or ring in the vicinity of the target, the warhead being sufficiently compact to fit within the allocated space in the frame of an aerial missile or projectile.

Still another object is to combine in a warhead, a shaped explosive charge with a new and improved rod structure to obtain generally uniform expansion of the rods and thereby form a substantially continuous loop or ring; the explosive charge being shaped by means of an innerliner or a filler of inert material and the rod structure employing a double layer of end-connected rods.

A further object is the provision of a tube assembly within the warhead to direct the shock waves resulting from detonation of the explosive charge against the rod structure in a desired manner to produce a generally uniform expansion of the rod structure into a substantially continuous loop or ring.

A still further object is the utilization of cut-off rings or tubes which transmit the detonation shock waves and function as shaped charge jets to break or cut-off the ends of the rods and release the rod structure for expansion into a substantially continuous loop or ring.

Other objects and many of the attendant advantages of this invention will be readily appreciated as the same becomes better understood by reference to the following detailed description when considered in connection with the accompanying drawings wherein:

FIG. 9 is a fragmentary detail view of a double layer rod arrangement, such as employed in the warheads of FIGS. 1 through 7, with a portion of the rod arrangement being shown partially expanded;

FIG. 10 is an end view of the double layer rod arrangement of FIG. 9 showing the form of weld between the end portions of the rods;

FIG. 11 is a fragmentary detail view of the welded ends of a pair of rods of the rod arrangement shown in FIG. 9, the welded ends comprising in effect a "plastic" pleat or hinge which is shown fully unfolded or expanded in the view;

FIG. 12 is a plan view, partly in section and with parts broken away, of a modified form of the warhead of this invention wherein a single layer of connected rods is employed;

FIG. 13 is a fragmentary detail view of the single layer rod arrangement of the warhead shown in FIG. 12, with the rod arrangement being shown partially expanded;

FIG. 14 is a plan view, partly in section, of a modification of the annular type of warhead; somewhat similar to that shown in FIG. 1;

FIG. 15 is a fragmentary detail view of a double layer rod assembly, such as employed in the warhead of FIG. 14, illustrating rod tilt or lean-to and shown partially expanded in the view;

FIG. 16 is a fragmentary detail view, partly in section, illustrating skewing of the rods in the rod assembly of an annular type warhead to reduce or eliminate rotation or twisting of the rods due to the directions of movements of the detonation fronts in the warhead;

FIG. 17 is a plan view, partly in section, of a modification of the semi-annular type warhead; somewhat similar to that shown in FIG. 3;

FIG. 18 is a schematic representation of the theoretical functioning of the warhead of this invention.

In general, the rod structure or assembly of the warhead, before firing, is a grouping or bundle of rods slightly shorter than the length of the warhead, welded together at the ends, and packaged into a double layer or a single layer. Since successive rods are joined at alternate ends, an outward push on the rod package by the explosive charge, after firing, causes the rod package to expand in diameter and the rods to bend near their welded ends.

The intent is to cause the rod bundle, during the period of its expansion, to strike the target aircraft and produce damage by cutting action.

The rod bundle is fastened to end plates, or the like, which hold the warhead together and confine the explosive charge during detonation. In some embodiments, the end plates are used also as structural members, and missile loads are transferred through the end plates and the warhead. A light stress skin of sheet steel, or the like, may be secured about the warhead for additional strength and aerodynamic purposes. Cutoff tubes at each end of the warhead are used to release the rod bundles from the end plates and to sever the stress skin.

The explosive charge is shaped in the warheads in such a manner that a substantially uniform velocity is achieved in all portions of the rod package. If the ends of the package receive less velocity than the center-of-length portion receives, tumbling, tangling and other troubles cause premature rod breakup. Shaping of the explosive generally is accomplished by shaping an innerliner and/or introducing an inert compound or material between the explosive and the rod bundle. The effort is toward reducing the velocity of the center-of-length of the rod bundle to a value substantially equal to the velocity at each end of the rod bundle, when the latter velocity value has been made as large as possible.

Figure 1:
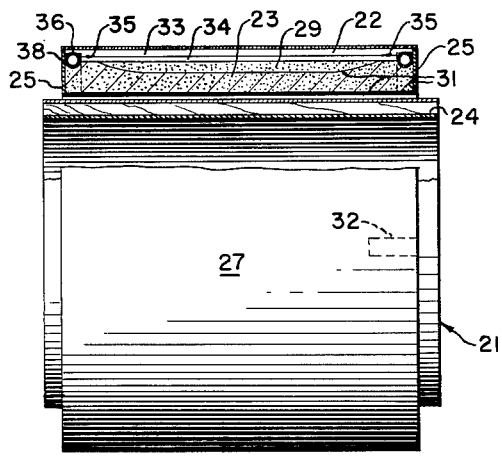
FIG. 1 is a plan view, partly in section, of an annular type connected rod warhead.

Referring now to the drawings, wherein like reference characters or numerals designate like or corresponding parts throughout the several views, there is shown in FIG. 1 one embodiment of the invention designated generally by reference numeral 21 and comprising rod structure or arrangement 22, an explosive charge 23 and a tube assembly 24.

Turning now to a more detailed description of warhead 21, the warhead includes a pair of spaced apart annular end plates 25 secured to the rod structure 22, as will be clearly understood by reference to FIG. 1. The rod structure 22 is tubularly arranged and is made up of a double layer or rods, connected in a manner hereinafter described, the rods being of steel or other suitable material. Surrounding the rod structure, and also secured to the end plate 25, is a thin tubular member 27, of steel, or the like, which serves as a stress skin for the warhead. The stress skin and the rod structure may be secured to the end plates by suintable means; for example, by tack welds, and, if desired, member 27 may also be tack welded to the rod structure at the central portions of the outer layer of rods.

Formed interiorly of the tubularly arranged rod structure, and in contact therewith, is a filler 29 of inert material such, for example, as plaster of Paris or polystyrene foam; preferably, the latter. The space or chamber between the filler and the end plates is filled by the explosive change 23; preferably, a high explosive which is liquid cast into place; the filler serving to shape the charge. The walls of the chamber containing the explosive charge 23, as well as the inner surface of the charge, may have applied thereto hot melt 31 which provides a protective coating.

The warhead 21 is provided with suitable means 32 such, for example, as a can or container forming a well in the explosive charge 23 and in which is inserted a conventional detonator-booster device for the purpose of detonating the charge. Of course, alternatively, end plate 25 could be provided with an opening and the explosive charge have a well formed therein to receive the detonator-booster device.

The inert filler 29, which may be molded into place, not only serves to shape the explosive charge 23, whereby a reduced amount of the explosive charge is centrally disposed with respect to the rod structure, but also acts as a buffer between the charge and the rod structure and adds more mass for the explosive charge to push, so that the rod structure is expanded generally uniformly as the charge explodes, the tube assembly 24 functioning to prevent the force of the explosive charge from going inwardly ahead of the progression of the burning of the charge. Without the tube assembly, the detonation wave would meet the rods on the opposite side and cause an undesirable breaking thereof.

As to the manner of fabricating the rod structure of the warhead of FIG. 1, attention is directed to FIGS. 9 and 10, wherein it will be noted that the rod structure comprises a layer of elongated rods 33 which are arranged in abutting relation parallel to each other and a layer of rods 34 angled slightly relative to the layer of rods 33 so that the end portions of each of the rods 34 are lapped by the end portions of the pair of rods 33 that are disposed in immediate adjacency, better understood by reference to FIG. 9. The aforementioned lapped ends of rods 33 and 34 are bonded together by means of tapered welds 35, as shown in FIG. 10, the meeting faces of the lapped end of the rods being suitably hollowed out to receive the weld material of welds 35.

More specifically, the end-portions of the rods 33 and 34 are hollowed out, as by machining the same, to provide therein tapered recesses which are placed in facing relation when the end portions of the rods are lapped in the fashion previously stated, the facing recesses defining a space later filled by the weld material of weld 35, FIGS. 8 and 10. In making up the rod structure, one method is to lap a rod 34 with a rod 33, hereinafter referred to as the original pair of rods, and weld the lapped end portions. A rod 34 is then added and placed in proper lapped relation to the free end portion of rod 33, after which weld 35 is applied. Next, rod 33 is added and welded, the rods being added alternately until a sheet of rods, end-connected in alternation, is formed, FIG. 9.

While rod 34 has been indicated as the first rod to be added to the original pair of rods, rod 33 could have been first added instead and the fabrication of the rod structure would, of course, have proceeded in the opposite direction.

When a sheet of rods of sufficient extent has been made up, with an equal number of rods in each layer, the sheet is wrapped or draped about a generally cylindrical surface. The terminal rods of the sheet are then lapped and welded; thereby producing a tubularly arranged rod structure.

Alaternatively, if desired, the tubularly arranged rod structure could be comprised of a plurality of sheets of rods, each such sheet being a segmental part of the rod structure.

The welds 35 serve first, to connect the rods together, and second, to cause a slow down in the opening or separation of the rods during the expansion of the rod structure following detonation of the explosive charge. Moreover, welds 35 combine with the bending characteristics inherent in the material of which the rods are made to form, in effect, unfoldable or expandable "plastic" pleats or hinges. During expansion of the rod structure following detonation of the explosive charge, the hinges or pleats cause resulting bends in the rods to be located adjacent or in close proximity to the welds 35, thereby permitting substantially full expansion of the rod structure into a substantially continuous loop or ring, before rupture occurs at the weaker points in the rod structure; see FIG. 14. Reference may be had to FIG. 11 which illustrates one of the "plastic" hinges or pleats, hereinbefore discussed, and is intended to depict the theoretical effect on the bending of the connected rods following expansion of the rod structure after detonation of the explosive charge. This "plastic" hinge or pleat is quite vital to the functioning and operation of the warhead since; it causes or permits substantially full expansion of the rod structure for maximum lethality, prior to breaking up into parts thereof. However, even after break-up of the expanded rod structure into segmental portions of various sizes, the continuity of the loop or ring is substantially maintained so as to have considerable destructive effect upon parts of the target struck thereby.

Figure 8:
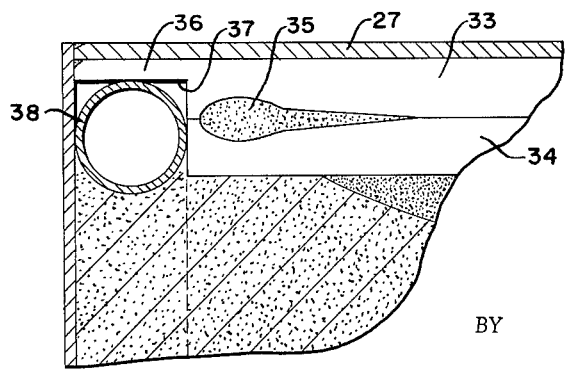
FIG. 8 is an enlarged fragmentary detail view showing the relationship of a cut-off tube to a double layer rod arrangement and to the explosive charge of the warhead.

Directing attention to FIGS. 1, 8 and 10, it will be noted that each of the ends of rods 33 is provided with a lip or finger 36, which is formed by cutting off the ends of rods 34 and notching the ends of rods 33, prior to tubularly arranging the rod structure. With the rod structure tubularly arranged, the notched ends of rods 33 and the cut-off ends of rods 34 define annular recesses or channels 37 at the ends of the rod structure, internally thereof. Disposed in each of the annular recesses or channels, is an annular tube or hollow ring 38, shown in detail in FIG. 8, tubes 38 being made of suitable material, such as metal, plastic or the like.

In operation, following detonation of the explosive charge 23, the tubes 38 transmit the detonation shock wave and function as shaped charge jets to break or cut-off the lips or fingers 36, thereby releasing the rod structure for expansion into a loop or ring; expansion of the rod structure rupturing the stress skin member 27.

Figure 3:
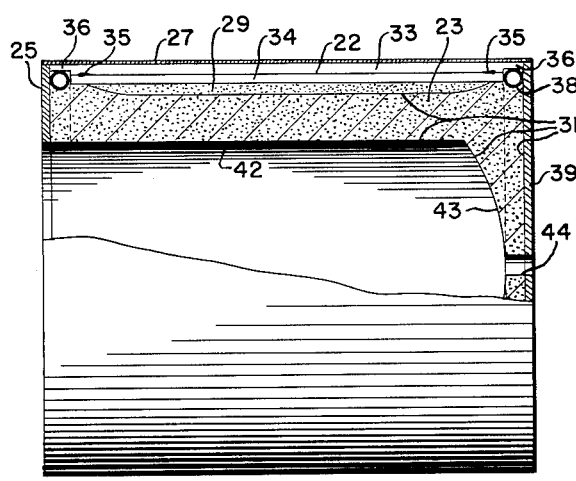
FIG. 3 is a plan view, partly in section, of a semi-annular type connected rod warhead.
Figure 4:
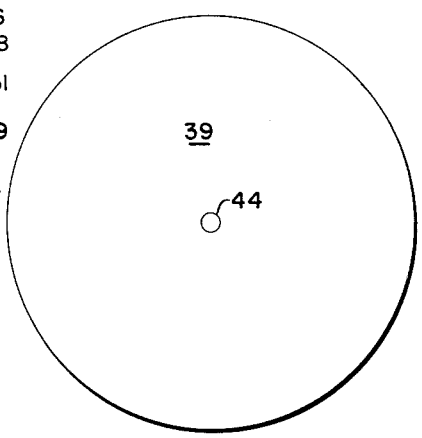
FIG. 4 is an end view of the warhead shown in FIG. 3.

In FIG. 3, there is shown another embodiment of the warhead of this invention, which will be referred to as the semi-annular type of warhead. The semi-annular type of warhead is provided with a tubularly arranged rod structure 22, fashioned in a manner similar to the embodident of FIG. 1, the rod structure being connected at one of its ends to an annular end plate 25 and at its other end to a disc like end plate 39, which closes off the last-mentioned end of the rod structure. This embodiment, like FIG. 1, is provided with a tubular filler of inert material 29, the filler being in contact with the inner surface of the tubularly arranged rod structure and serving to shape an explosive charge 23. The explosive charge is formed with a tubular portion 42 and a dome-like portion 43, the free end of the tubular portion terminating at end plate 25 and the dome-like portion being located adjacent end plate 39.

The inner surfaces of the end plates and the filler of inert material may have applied thereto hot melt 31 prior to casting the explosive charge into place. Hot melt 31 may also be applied to the exposed surfaces of the tubular and dome-like portions of the charge. Centrally of the dome-like portion, and within the explosive charge, is situated a means 44, such as a container or a well in the explosive charge, which means receives a detonator-booster device of conventional design for the purpose of detonating the explosive charge. A tubular stress skin member 27 and cut-off tubes 38 are employed with the semi-annular type of warhead.

Figure 5:
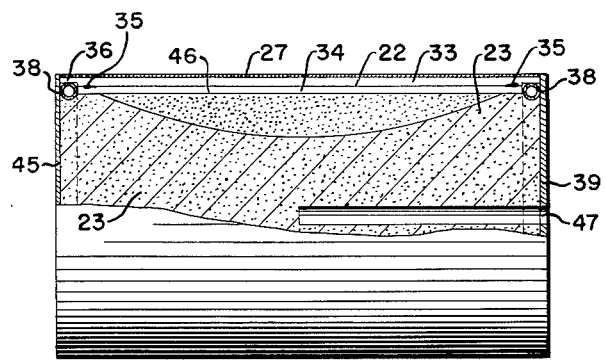
FIG. 5 is a plan view, partly in section, of a solid cylinder type connected rod warhead.
Figure 6:
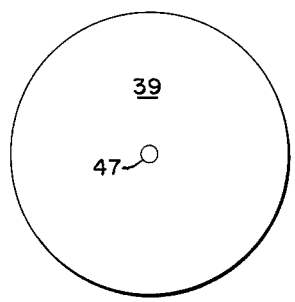
FIG. 6 is an end view of the warhead shown in FIG. 5.

The embodiment of FIG. 5 is that of a solid cylinder type of warhead in which a tubularly arranged rod structure 22 is closed at its ends by disc-like end plates 39 and 45. Formed interiorly of the tubularly arranged rod structure, and in contact therewith, is a tubular filler 46 of inert material, of the shape shown in FIG. 5, which serves to shape an explosive charge 23 contained in the space substantially defined by the end plates 39 and 45 and the filler 46. The interior of the warhead may have hot melt applied thereto before the explosive charge is cast therein. This type of warhead is provided with cut-off tubes 38 and a stress skin member 27. For detonating the explosive charge, there is provided a centrally located means 47, such as a container or a well in the explosive charge, for receiving a conventional detonator-booster mechanism, a suitable opening being provided in end plate 39.

Figure 7:
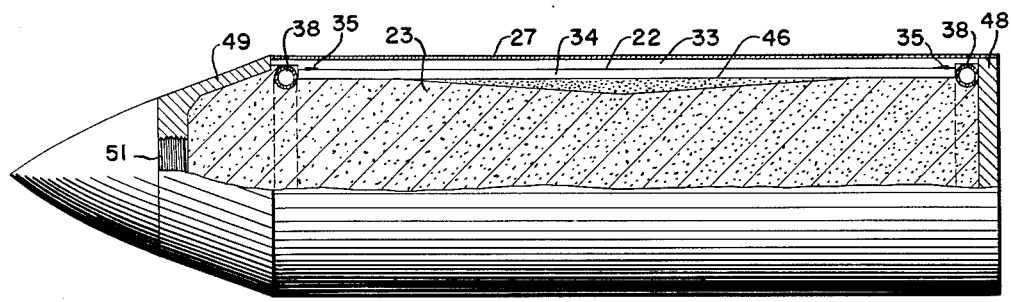
FIG. 7 is a plan view, partly in section, or a modified form of a solid cylinder type connected rod warhead, wherein the explosive charge is arranged to extend beyond one end of the rod structure.

In FIG. 7, there is illustrated a modification of the solid cylinder type of warhead wherein a tubularly arranged rod structure 22 is closed off at one end by a disc-like end plate 48 but the other end of the rod structure is closed off by a cup-like member 49, whereby an additional space is provided beyond one end of the rod structure to form an extension of the chamber containing explosive charge 23. The numeral 51 represents means which receives the usual detonator-booster mechanism for setting off the explosive charge, the other numerals representing elements already described and the functions of which should be apparent, without further detailed description.

The modification shown in FIG. 14 is somewhat similar to the annular type of warhead shown in FIG. 1, but differs therefrom in that the explosive charge 23' is shaped by means of a bowed innerliner 30, of thin metal or the like, and the rod structure or assembly 22' is made up of a plurality of segments of tilted rods 33' and 34'. In lieu of a filler of inert material, the explosive charge is shaped by the innerliner which is formed with cylinder-like ends joined by a barrel-like intermediate portion bowed toward the rods. This embodiment of the invention is provided with a tube assembly 24' which corresponds to the tube assembly 24 of FIG. 1 and serves the same purpose. The other numerals in FIG. 14 designate parts that are similar to those designated likewise in FIG. 1.

Referring to FIGS. 14 and 15, it will be noted the rods are disposed with a tilt or lean-to. That is, the longitudinal axes of the rods are not disposed parallel to the warhead axis but are angled, tilted or leaned toward the detonator-booster 32. The amount of tilt or lean-to may be better appreciated by noting, in FIG. 15, the angle between the sides of the lowermost rods 33' and 34' and a reference line drawn parallel to the warhead axis and located below the rods.

The detonation fronts, which originate at the detonator-booster 32, move in opposite directions around the waread and have a tendency to cause tumbling of the rods during expansion of the rod assembly and the purpose of leaning the rods is to overcome this tendency.

An additional feature of this modification is that the rod assembly is made up a pair of semi-circular segments, each segment having rods tilted or leaned in opposite directions towards the detonator-booster 32, as will be best understood by reference to FIG. 14.

Figure 2:
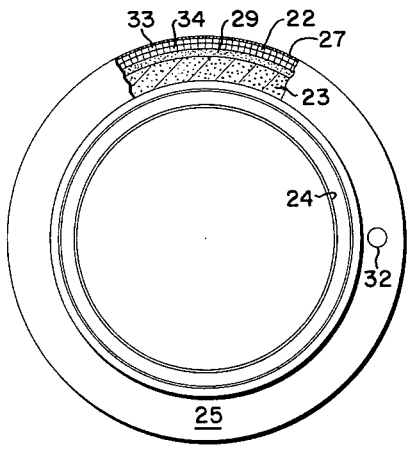
FIG. 2 is an end view, partly in section, of the warhead shown in FIG. 1.

Another effect of the detonation fronts moving in opposite directions around the warhead is the tendency of the detonator fronts to cause sufficient rotation or twisting of rod pairs to produce premature rod breakup. To offset this rotational effect, the rod pairs are partially rotated or skewed about their longitudinal axes in a direction opposite to the rotation induced by the respective detonation front. In other words, instead of the rod pairs being disposed so that the short axes thereof are substantially radial (FIG. 2), the rod pairs are disposed so that the short axes thereof are angled relative to radial lines and in a direction opposite to the rotational effect of the respective detonation front; see FIG. 16. This results in the outer faces of the outer rods no longer being tangent to the periphery of the warhead.

In the modification of the semi-annular type of warhead shown in FIG. 16, the filler of inert material is omitted and the explosive charge is shaped by molding the interior thereof to form therein an arch portion 41 bowed toward the rods and symmetrical with respect to the warhead axis. The other parts of FIG. 16 are similar to corresponding parts in FIG. 3, which have like reference numerals directed thereto, and serve the same purposes.

It is understood, of course, that, in the embodiments and modifications hereinbefore described, detonation of the explosive charge may be accomplished by a suitable detonator-booster device supported on one of the end plates, as well as by a device housed within the charge. It is also to be understood that, although means have been illustrated for supporting only one detonator-booster device in operative relation to the explosive charge, a plurality of such means may be employed in order that multiple detonation of the explosive charge may be effected.

While the embodiments of FIGS. 1–7 and 14–17 relate to double layer structures, the form of the invention shown in FIG. 12 employs a rod structure comprising a single layer of rods. The single layer rod structure is designated by numeral 52 and is made up of a layer of rods 53, these rods being disposed parallel to each other and arranged in a tubular configuration. Each of the rods 53 is connected at its ends to the ends of the adjacent rods, at the meeting faces thereof, by means of welds 54, more clearly seen in FIG. 13. The ends of the rods are connected in alternation so that as the tubularly arranged rod structure is expanded, a loop or ring, with the rods in zig-zag formation, is produced; better understood by reference to FIGS. 13 and 18.

A hoop or ring 55 is secured to the ends of the rods at one end of the tubularly arranged rod structure 52 by suitable means, such as welds, the other end of the rod structure being similarly secured to a hoop or ring 56. The ends of the rod structure are closed by a pair of disc-like end plates 57, suitably secured, for example, by welding, to hoops or rings 55 and 56, respectively.

Formed interiorly of the tubular arranged rod structure, and in contact with the rods 53, is a tubular filler 58 of inert material, the material being of like kind to that used in other embodiments, hereinbefore described. The filler and end plates 57 substantially define an enclosure into which an explosive charge 23, of desirable form, is cast, hot melt 31 first being applied to the enclosure, if desired.

The filler and a stress skin member 27 perform the same functions as in the other embodiments. The explosive charge may be detonated by a suitable detonator-booster device disposed in a container 59, or the like, attached to one of the end plates 57.

FIG. 18 is a schematic representation illustrating the theoretical operation of the warhead of this invention and is illustrative of either the double layer rod warhead or the single layer rod warhead. Following detonation of the explosive charge of the warhead, the tubularly arranged rod structure thereof is subjected to forces having a component acting generally parallel to the trajectory 61 of a missile 62, due to the velocity of the missile, and a component acting laterally outwardly, due to the detonation of the explosive charge; the missile having incorporated therein a warhead 63, which warhead may take the form of any one of the embodiments herein described. In FIG. 18, the first mentioned component is designated $V_m$ and the second mentioned component is designated $V_l$. Numeral 64 is used to designate a point or stage in the operation of the warhead and at this point the rods are illustrated as having travelled beyond the point of detonation of the explosive charge, under the action of the force component $V_m$, and the rod structure has expanded during such travel, because of the action of force component $V_l$, to assume the theoretical disposition shown. Numeral 65 represents a further stage or point in the travel of the rod structure and theoretically represents or indicates the expansion of the rod structure into a continuous unbroken loop or ring, in the case of a rod structure comprising a single sheet of rods with terminal rods joined, or a substantially continuous loop or ring, in the case of a rod structure made up of a plurality of segmental parts with each part being formed of a sheet of rods; these loops or rings being designated by numeral 66.

At a later stage 67, the loop or ring 66 is shown fully expanded. It is at stage 67, with the rod structure fully expanded, while still maintaining its continuity or substantial continuity, as the case may be, that maximum deadlines, with optimum probability of destruction of a target, is attained. Beyond stage 67, further expansion causes the loop or ring 66 to separate, at its weaker points, into segmental portions made up of one or more rods and this is schematically represented at a stage designated by numeral 68. However, even at stage 68, the lethality is extremely great, the expanded rod structure, in effect, constituting a substantially continuous loop or ring 69.

Figure 19:
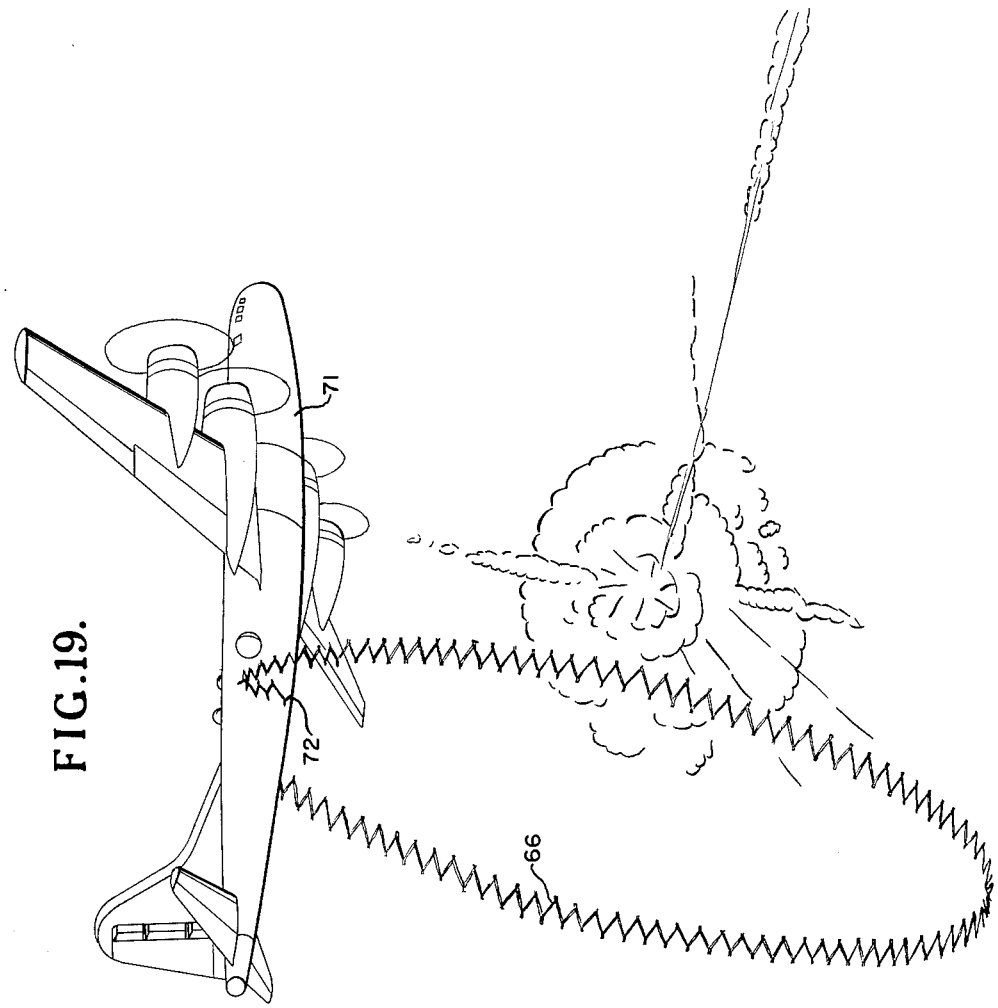
FIG. 19 is a perspective view illustrating the effect of a fully expanded connected rod warhead on a target aircraft following the explosion of a missile carrying the warhead in the vicinity of the target.

The lethality of the warhead may be better appreciated by reference to FIG. 19, wherein the missile carrying one of the warheads of this invention is detonated in the vicinity of a target aircraft 71 and the loop or ring 66 (or 69) strikes the target aircraft and inflicts damage upon structural components thereof, as designated by reference numeral 72, with very great target "kill" probability.

From the foregoing description, the operation of the warhead of this invention should be readily apparent; it being understood, of course, that the missile carrying the warhead will be provided with appropriate propulsion means and influence devices to propel the missile to the vicinity of the target and detonate the warhead there.

Whereas, only a few embodiments and modifications have been shown and described, it is obvious that many modifications and variation of the present invention are possible in the light of the above teachings and it is therefore to be understood that the invention may be practiced otherwise than as specifically described.

What is claimed and desired to be secured by Letters Patent of the United States is:

1. A warhead comprising, in combination, a tubularly arranged rod structure, an explosive charge disposed within said rod structure, and a tubular filler of inert material formed within the tubularly arranged rod structure and in contact therewith, said filler shaping the explosive charge, and said rod structure including a plurality of elongated rods arranged generally parallel to each other in layer formation, each of the rods at its end-portions being substantially rigidly connected in alternation of the rods immediately adjacent thereto, the explosive charge being operable upon detonation for expanding the tubularly arranged rod structure into a missile having a substantially arcuate contour.

2. A warhead as recited in claim 1, said explosive charge being tubular, and a tube assembly centrally disposed within the explosive charge and at least coextensive therewith longitudinally.

3. A warhead as recited in claim 1, and said explosive charge including a tubular portion and a dome-like portion, and said dome-like portion being located at one end of the tubular portion.

4. A warhead as recited in claim 1, further comprising a pair of end plates closing off the ends of the rod structure and secured thereto, said tubular filler and end plates substantially defining a chamber, and said explosive charge being contained in said chamber.

5. A warhead as recited in claim 1, further comprising a cup-like member attached to one end of the rod structure and enclosing a space beyond said end of the rod structure, said explosive charge having a portion thereof disposed in said member.

6. A warhead as recited in claim 1, wherein the layer formation consists of an inner layer of rods and an outer layer of rods.

7. A warhead as recited in claim 6, wherein each of the rods in the inner layer is lapped at the end portions thereof by the end-portions of the rods in the outerlayer immediately adjacent thereto, said lapped end-portions having abutting faces.

8. A warhead as recited in claim 1, wherein the end-portions have hollowed out portions and the end-portions are connected together by weld material disposed in the hollow out portions.

9. A warhead as recited in claim 8, wherein the hollowed out portions are tapered and the weld material disposed therein converges from the ends of the rods toward the intermediate portions of the rods.

10. A warhead as recited in claim 1, said explosive charge being tubular, a single detonator-booster device disposed at one end of the charge; whereby detonation fronts originating at the device move in opposite directions through the tubular charge, and said rods being skewed about the longitudinal axes thereof in a direction opposite to the direction of the respective detonation front.

11. A warhead comprising, in combination, a tubularly arranged rod assembly, an explosive charge disposed within said rod assembly, and a tubular filler of inert material within said rod assembly, said filler being in contact with said rod assembly and shaping said explosive charge, said rod assembly including a plurality of segments, each segment comprising plurality of elongated elements arranged generally parallel to each other in layer formation, each element at its end-portions being substantially rigidly connected in alternation to elements adjacent thereto, the explosive charge being operable upon detonation for expanding the elements of the rod assembly into a plurality of missiles corresponding in number to the plurality of segments in the rod assembly and having a substantially arcuate contour.

12. A warhead according to claim 11, wherein the elements are disposed with the longitudinal axis of each element at an angle to a line parallel to the warhead axis; whereby the elements are tilted with respect thereto.

13. A warhead according to claim 11, wherein the explosive charge is tubularly arranged and is provided with a single detonator-booster device at one end of the charge; whereby detonation fronts originating at the device move in opposite directions through the tubularly arranged charge, and the segments are semi-circular, the elements of each segment being tilted towards the device and opposite to the direction of movement of the respective detonation front.

14. A warhead comprising, in combination, a layer of elongated rods, said rods being alternately connected at their ends and disposed in a tubular configuration, a pair of end plates disposed at the ends of the rods and connected thereto, respectively, a tubular filler of inert material extending between the ends of rods and in engagement with said layer of rods interiorly thereof, an explosive charge in contact with said filler and extending between said end plates, and a covering surrounding said rods, said covering being connected to the end plates and having a tubular configuration.

15. An ordnance article comprising an outer layer of rods and an inner layer of rods, said layers of rods being arranged in a tubular configuration, the rods of the outer layer being disposed generally parallel to each other and each being provided with a frangible finger at the ends thereby, the rods of the inner layer being angled slightly with respect to the rods of the outer layer and disposed so that the end-portions of each rod of the inner layer are lapped by the end-portions of adjacent rods in the other layer, and means connecting said lapped end-portions.

16. A warhead comprising, in combination, a tubularly arranged rod structure, and an explosive charge disposed within said rod structure, said rod structure including a plurality of elongated rods arranged generally parallel to each other in layer formation, each of the rods at its end-portions being substantially rigidly connected in alternation to the rods immediately adjacent thereto, each of the ends of the rod structure having an internal annular channel formed therein, and a pair of annular tubes, there being one of said tubes in each of said channels respectively, detonation of the explosive charge being adapted to expand the tubularly arranged rod structure into a substantially continuous loop of rods.

17. A warhead comprising, in combination, a tubularly arranged rod structure and an explosive charge disposed within said rod structure, said rod structure including a plurality of elongated rods arranged generally parallel to each other in layer formation, said layer formation consisting of an inner layer of rods and an outer layer of rods, each of the rods of the outer layer having a pair of frangible fingers at the ends thereof, said fingers defining a pair of annular channels at the respective ends of the rod structure, and an annular tube disposed in each of said channels respectively, each of the rods at its end-portions being substantially rigidly connected in alternation to the rods immediately adjacent thereto, detonation of the explosive charge being adapted to expand the tubularly arranged rod structure into a substantially continuous loop of rods and said tubes being adapted to transmit the shock wave caused by the detonation and to function as shaped charge jets to break said fingers; whereby the rod structure is released for expansion.

18. A warhead comprising, in combination, a tubularly arranged rod structure, a thin innerliner disposed within said rod structure and spaced therefrom to provide a space therebetween, and an explosive charge disposed within said space, said innerliner being formed with a barrel-like portion bowed toward the rod structure for shaping the explosive charge, said rod structure including a plurality of elongated rods arranged generally parallel to each other in a layer formation, each of the rods at its end-portions being substantially rigidly connected in alternation to the rods immediately adjacent thereto, detonation of the explosive charge being adapted to expand the tubularly arranged rod structure into a substantially continuous loop of rods.

19. A warhead according to claim 18, a tube assembly within said innerliner and concentric therewith, said tube assembly being at least coextensive with said innerliner.

20. A warhead comprising, a combination, a tubularly arranged rod structure, and an explosive charge disposed within said rod structure, said explosive charge being formed with an arched portion bowed toward the rod structure and symmetrical with respect to the warhead axis for shaping the charge, said rod structure including a plurality of elongated rods arranged generally parallel to each other in a layer formation, each of the rods at its end-portions being substantially rigidly connected in alteration to the rods immediately adjacent thereto, detonation of the explosive charge being adapted to expand the tubularly arranged rod structure into a substantially continuous loop of rods.

21. A warhead comprising, in combination, a rod structure arranged as a tube and composed of a plurality of rod elements, each of the rod elements at the end-portions thereof being substantially rigidly connected in alternation to immediately adjacent rod elements at the end-portions thereof, a shaped explosive charge within said rod structure and in contact therewith, said explosive being operable upon detonation for expanding said rod structure and projecting it as a missile having a substantially arcuate contour.

References Cited by the Examiner
UNITED STATES PATENTS

| | | | |
|---|---|---|---|
| 1,211,001 | 1/1917 | Steinmetz | 102—63 |
| 1,247,331 | 11/1917 | Robinson | 102—63 |
| 1,312,765 | 8/1919 | Straub | 102—63 |
| 2,308,683 | 1/1943 | Forbes | 102—89 |
| 2,322,624 | 6/1943 | Forbes | 102—89 |
| 2,354,451 | 7/1944 | Forbes | 102—63 |
| 2,809,585 | 10/1957 | Moses. | |

BENJAMIN A. BORCHELT, *Primary Examiner.*

SAMUEL BOYD, ARTHUR M. HORTON, FRED C. MATTERN, JR., *Examiners.*

W. J. NELSON, *Assistant Examiner.*